Figure 1:
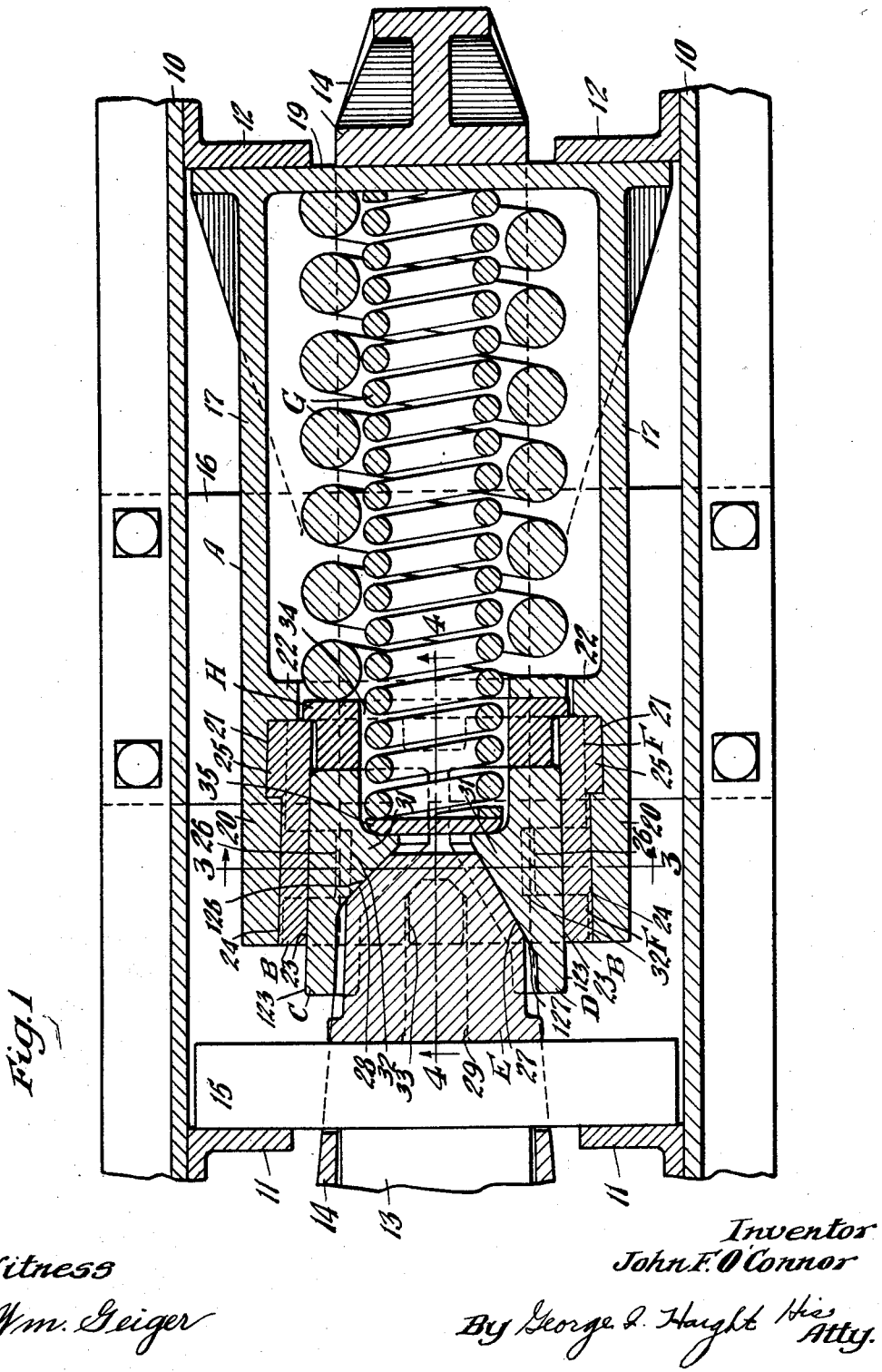

March 26, 1929.  J. F. O'CONNOR  1,706,464
FRICTION SHOCK ABSORBING MECHANISM
Filed Sept. 2, 1927  2 Sheets-Sheet 1

Witness
Wm. Geiger

Inventor
John F. O'Connor
By George I. Haight his Atty.

March 26, 1929.  J. F. O'CONNOR  1,706,464
FRICTION SHOCK ABSORBING MECHANISM
Filed Sept. 2, 1927  2 Sheets-Sheet 2
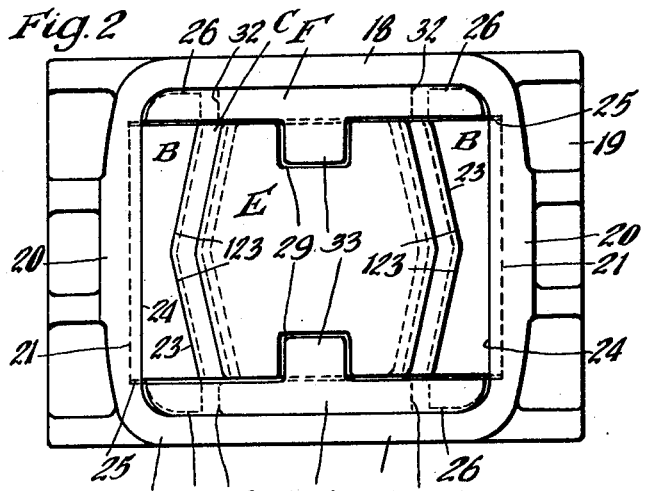
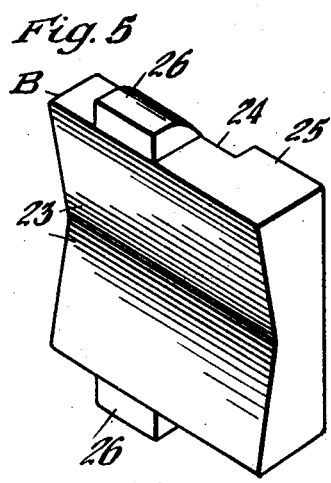
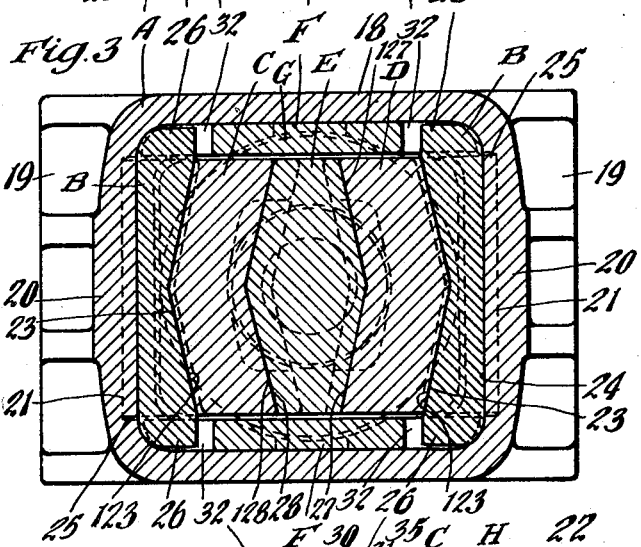
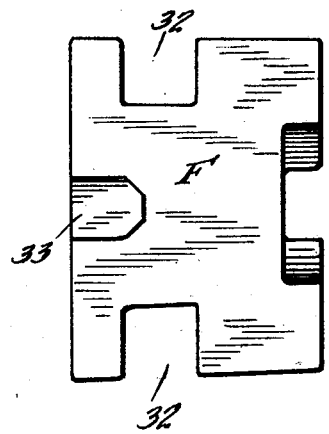
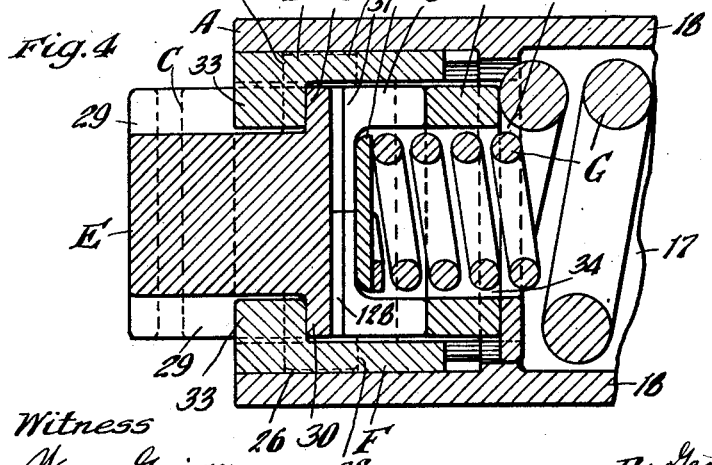
Inventor
John F. O'Connor
By George J. Haight
Atty.
Witness
Wm. Geiger Patented Mar. 26, 1929.

1,706,464

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed September 2, 1927. Serial No. 217,184.

This invention relates to improvements in friction shock absorbing mechanism.

One object of the invention is to provide a friction shock absorbing mechanism of high capacity specially adapted for railway draft riggings, including a friction casing and a friction wedge system including wedge means co-operating with the casing wherein simple and efficient means is provided for holding the parts assembled and limiting outward movement of the wedge means. Another object of the invention is to provide a friction shock absorbing mechanism of the character indicated, including a friction shell provided with detachable liners presenting opposed interior friction surfaces, friction shoes co-operating with liners and wedge means engaging the shoes, together with simple and efficient retaining means for anchoring the wedge means to the liners and holding the mechanism assembled.

A further object of the invention is to provide a friction shock absorbing mechanism including a friction shell provided with interior friction surfaces, friction shoes cooperating with the shell, a wedge block having wedging engagement with the shoes, a retaining means for anchoring the wedge block to the shell, wherein the retaining means includes wear-plate elements for protecting the inactive portions of the interior surfaces of the shell.

Further objects and advantages of the invention will more fully and clearly appear from the description and claims hereinafter following.

In the drawings forming a part of this specification, Fig. 1 is a horizontal longitudinal sectional view of a portion of a railway draft rigging showing my improvements in connection therewith. Fig. 2 is a front end elevational view of the shock absorbing mechanism proper. Fig. 3 is a vertical transverse sectional view corresponding substantially to the line 3—3 of Fig. 1. Fig. 4 is a longitudinal vertical sectional view of the forward end portion of the shock absorbing mechanism proper, corresponding substantially to the line 4—4 of Fig. 1, and Figures 5 and 6 are detailed perspective and plan views, respectively, of one of the liner elements and one of the retaining plates employed in connection with my improved shock absorbing mechanism.

In said drawings, 10—10 indicate channel shaped center or draft sills of a railway car underframe, to the inner sides of which are secured the usual front stop lugs 11—11 and rear stop lugs 12—12. The rear end portion of the drawbar is designated by 13, to which is operatively connected a yoke 14, of well known form. The shock absorbing mechanism proper and a front main follower 15 are disposed within the yoke, and the yoke in turn is supported in operative position by a detachable saddle plate 16 secured to the draft sills.

My improved shock absorbing mechanism proper comprises broadly a casing A; a pair of detachable liners B—B; two friction shoes C and D; a main wedge E; a pair of retaining wear plates F—F; a main spring resistance G; and a spring follower H.

The casing A, is in the form of a substantially rectangular box-like casing having longitudinally extending vertically disposed spaced side walls 17—17, horizontally disposed longitudinally extending spaced top and bottom walls 18—18, and a transverse vertical rear end wall 19. The end wall 19, as most clearly shown in Fig. 1, projects outwardly beyond the side walls 17 and is reenforced by longitudinally extending webs formed integrally with the side walls. The end wall 19 co-operates with the rear stop lugs 12 in the manner of the usual rear follower. The side walls 17 of the casing A are inwardly thickened at the front ends thereof, as indicated at 20. The thickened portions of the side walls are interiorly slotted inwardly of the front end of the casing as indicated at 21, to provide retaining seats for the detachable liners B. Rearwardly of the seats 21 the side walls are provided with inward projections 22—22 defining vertically disposed stop ribs.

The liners, B, which are two in number, are detachably connected to the side walls of the casing A and held against longitudinal movement with respect to the casing. The two liners are of similar design and, as more clearly shown in Figures 1 and 5, are in the form of relatively heavy plates having longitudinally disposed interior flat friction surfaces 23 on the inner sides thereof. On the outer side each liner is also provided with a flat surface 24 adapted to bear on the inner surface of the corresponding side wall of the casing. As most clearly illustrated in Fig. 1, the surfaces of the side walls, on which the outer surface of the liners bear, are inclined to the longitudinal axis of the mechanism and converge inwardly of the casing. The interior friction surfaces 23 of the liners are substantially parallel to the outer surface 24 thereof, and consequently also converge inwardly of the casing. At the rear end, each liner is provided with a lateral enlargement 25 on the outer side thereof adapted to fit snugly within the corresponding seat 21 of the side wall 17. It will be evident that the enlargements 25 of the liners which are seated in the recesses 21, serve to retain the liners assembled with the casing and prevent longitudinal movement of the liners with respect to the casing. Inwardly of the front end thereof, each liner B is also provided with top and bottom retaining lugs 26—26 which co-operate with the retaining plates F, as hereinafter pointed out.

The wedge block E has a flat front end face bearing directly on the inner side of the main follower 15. At the inner end, the wedge block E is provided with a pair of wedge faces 27 and 28 on the opposite sides thereof. The wedge face 27 is preferably inclined at a relatively keen wedge-acting angle with respect to the longitudinal axis of the mechanism, while the wedge face 28 is disposed at a relatively blunt releasing angle with respect to said axis. The top and bottom portions of the wedge block E are longitudinally slotted as indicated at 29—29, the slots 29 being open at their front ends and presenting rear abutment walls 30, co-operating with retaining means on the plates F, as hereinafter more clearly pointed out.

The friction shoes C and D, which are two in number, are disposed on opposite sides of the mechanism and are interposed between the wedge block E and the liners B. The two friction shoes C and D are of similar design, except as hereinafter pointed out. Each shoe is provided with a longitudinally disposed outer friction surface 123, adapted to co-operate with the friction surface 23 of the corresponding liner. On the inner side each shoe is laterally enlarged as indicated at 31, the enlargement 31 being provided with a wedge face on the forward side thereof. The wedge face of the shoe C is designated by 128, while the wedge face of the shoe D is designated by 127. The wedge face 127 of the shoe D is similarly inclined to the wedge face 27 of the wedge block E, and is adapted to co-operate therewith, while the wedge face 128 of the shoe C is correspondingly inclined to the wedge face 28 and adapted to co-operate therewith.

The inter-engaging wedge faces 27 and 127, the inter-engaging wedge faces 28 and 128, of the wedge block and shoes C and D, and the inter-engaging friction surfaces of the shoes and the liners B are preferably of V-shaped section so that same will interlock the wedge block shoes and liners, thereby limiting movement of these parts to a direction longitudinally of the mechanism.

The retaining plates F are substantially rectangular outline as most clearly shown in Fig. 6. Each of the plates F is provided with a pair of notches 32—32 at the opposite sides thereof, adapted to receive the lugs 26, at the corresponding side of the liners B. As clearly shown in Figures 2, 3, and 4, one of the plates F is interposed between the top wall of the casing A and the wedge block and friction shoes, while the other plate F is interposed between the bottom wall and the wedge block and shoes. Each of the plates F is also provided with an inwardly projecting central lug 33 at the forward end thereof, the lug of the top plate F projecting downwardly, and that of the bottom plate F projecting upwardly. The lugs 33 engage within the slots 29 of the wedge block E and co-operate with the inner abutment walls 30 of the slots to limit outward movement of the wedge block and retain the same assembled with the casing A.

The main spring resistance G comprises a relatively light inner coil and a heavier outer coil, both coils having their rear ends bearing directly on the end wall 19 of the casing. The front end of the outer coil bears on the spring follower H, which is interposed between this coil and the inner ends of the friction shoes C and D. The spring follower H is in the form of a heavy rectangular plate-like member having a central opening 34 therein, through which the inner coil of the spring G extends. A spring follower disc 35 is interposed between the front end of the inner coil with the spring resistance, and the enlargement 31 of the friction shoes C and D.

All the parts of the mechanism are so proportioned that when the same is assembled, the main spring resistance G will be under initial compression, thereby maintaining the friction shoes and wedge means in the outermost position, thereby maintaining the liners interlocked with the side walls of the casing. It is also pointed out that, due to the tendency of the springs to expand, compensation for wear of the various friction and wedge faces of the mechanism is also had, inasmuch as the central coil of the spring resistance maintains the friction shoes in the outermost position.

In assembling my improved shock absorbing mechanism the main spring resistance comprising the inner and outer coils is first entered within the casing A. The spring follower H is then placed in position. The entire friction system, including the main wedge E, the friction shoes C and D, the top and bottom retaining plate elements F, and the liners B, are assembled as a unit, the lugs 33 of the retaining plates F being engaged within the slots 29 of the wedge E, and the lugs 26 of the two liners engaged with the notches 32 of the top and bottom retaining plates F. The assembled friction unit is then inserted within the casing, the same being first laterally compressed so that the enlargements 25 on the outer sides of the liners B will pass between the opposed side walls of the casing A. The unit is then forced into the casing until the enlargements 25 of the liners register with the seats 21 of the side walls 17. When the parts have been thus positioned the friction unit is permitted to expand under the action of the main spring resistance G, thereby seating the enlargements 25 of the liners within the seats 21 and anchoring the entire unit to the casing A. The assembling of the friction unit with the casing is facilitated by the inclined interior surfaces of the side walls, as these surfaces converge inwardly of the mechanism. As will be evident the expansive action of the spring resistance G, which, as hereinbefore pointed out, is under initial compression, forces the friction shoes into engagement with the wedge faces of the block E, thereby tending to spread the shoes apart and pressing the liners against the side walls of the casing to maintain the same in anchored relation with the seats 21. It is also pointed out that the notches 32 of the retaining plates F are of such a depth as to permit the necessary lateral approach of the liners B, to allow the enlargements 25 to clear the side walls of the casing when the liners are inserted within the same.

The operation of my improved shock absorbing mechanism, assuming a compression stroke, is as follows: the main follower 15 and the casing A are moved relatively toward each other, thereby forcing the wedge block E, and the friction shoes C and D, inwardly of the casing along the friction surfaces of the liners B while wedging the shoes apart. The inward movement of the parts will continue either until the actuating force is reduced or the follower 15 comes into engagement with the front end of the casing A, whereupon the actuating force will be transmitted directly through the casing to the stop lugs of the draft sills, the casing acting as a solid column load-transmitting member to prevent the main springs from being unduly compressed. During release of the mechanism, upon the actuating force being reduced, the spring resistance G will force the friction shoes outwardly carrying the wedge block therewith. Movement of the wedge block E is finally limited by engagement of the abutment shoulders 30 thereof with the lugs 33 of the retaining plates F, the retaining plates F being held stationary by the lugs 26 which engage within the notches 32.

As will be evident from the preceding description, taken in connection with the drawings, I have provided a very simple and efficient means for holding the wedge blocks and other parts of the mechanism assembled, which may be readily attached to the casing. It is further pointed out that by my improved retaining means, danger of the parts becoming accidentally disengaged is substantially prevented.

While I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with a rectangular friction shell, the two opposed side walls thereof being provided with interior friction surfaces; of friction shoes engaging the friction surfaces of the shell; a main wedge co-operating with the shoes; plate-like retaining means interposed between the remaining side walls of the shell and the wedge and shoes, said retaining means being anchored to the shell and having direct shouldered engagement with the wedge to limit outward movement of the latter and hold the same assembled with the shell.

2. In a friction shock absorbing mechanism, the combination with a friction casing having two sets of opposed walls; of liners detachably secured to one set of said opposed walls; wear-plates protecting the remaining opposed set of walls, said wear-plates being anchored to the liners; friction shoes engaging the liners; spring resistance means opposing inward movement of the shoes; a pressure transmitting block having wedging engagement with the shoes, and co-operating abutment means on said block and wear-plates for eliminating outward movement of the wedge and holding the same assembled with the shell.

3. In a friction shock absorbing mechanism, the combination with a rectangular casing having top, bottom and opposed side walls; of liners detachably secured to said side walls, said liners having retaining ribs engaging in seats provided in the side walls, said liners being provided with top and bottom lugs, top and bottom retaining plates having anchoring recesses receiving the retaining lugs of the liners, said plates being provided with anchoring lugs; friction shoes co-operating with the liners; and wedge block having wedging engagement with the shoes, said wedge block having abutment shoulders engaging behind the anchoring lugs of the retaining plates.

In witness that I claim the foregoing I have hereunto subscribed my name this 30th day of August, 1927.

JOHN F. O'CONNOR.